UNITED STATES PATENT OFFICE.

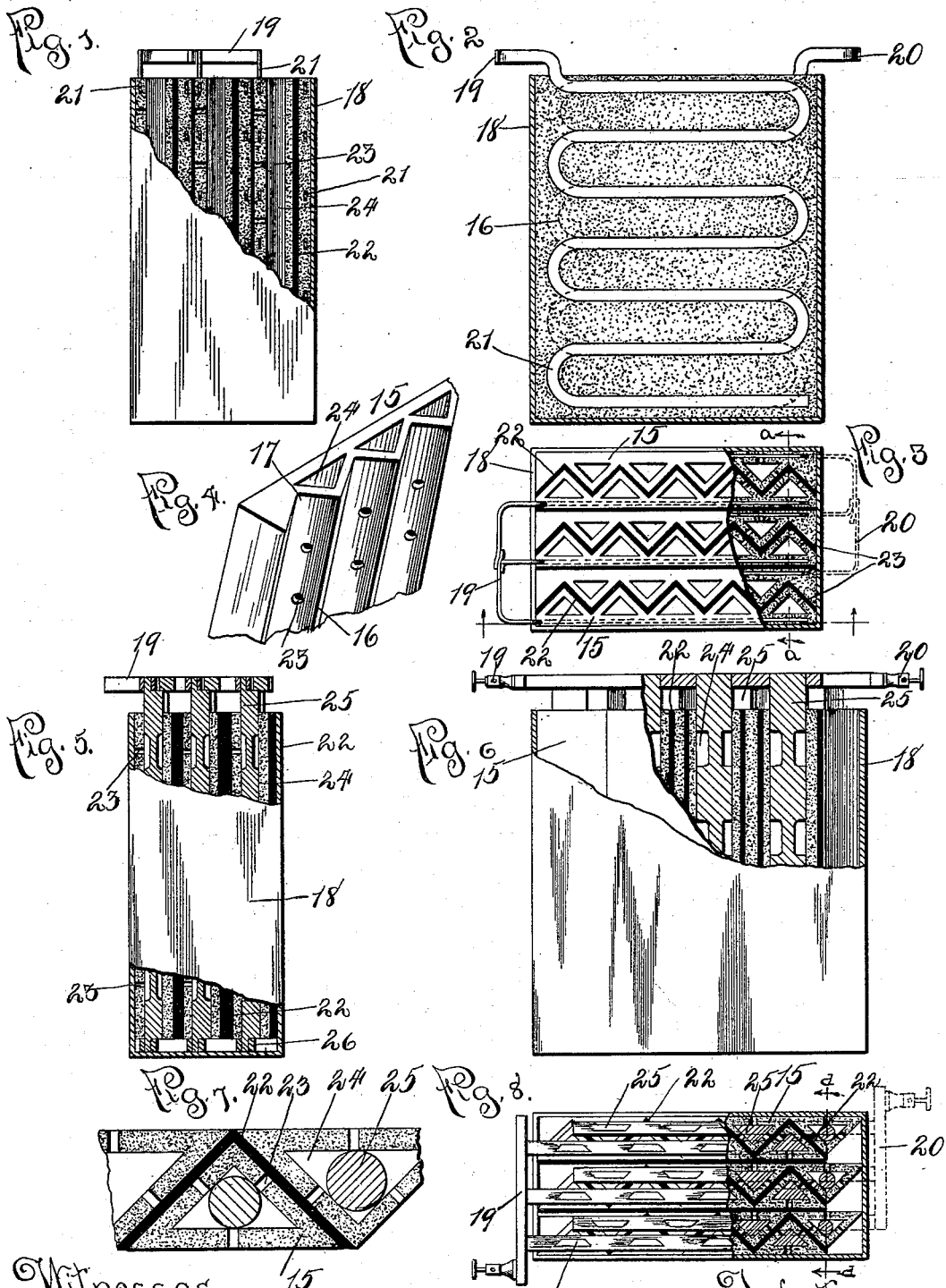

CHARLES RIDSDALE, OF CHICAGO, ILLINOIS.

SECONDARY BATTERY.

SPECIFICATION forming part of Letters Patent No. 628,492, dated July 11, 1899.

Application filed May 28, 1897. Serial No. 638,547. (No model.)

*To all whom it may concern:*

Be it known that I, CHARLES RIDSDALE, a subject of the Queen of Great Britain, residing at Chicago, in the county of Cook and State of Illinois, have invented a certain new and useful Secondary Battery, of which the following is a specification.

My invention is designed to provide a secondary or storage battery element the plates or electrodes of which are so constructed, arranged, relatively positioned, and held together as to provide an element practically free from sulfation, short-circuiting, and other like evils, which element has its plates or electrodes closely and compactly assembled together.

My invention in accomplishing the foregoing results is also designed to provide an element the plates or electrodes of which are so constructed as to provide a maximum of conductivity and of penetration of the solution or electrolyte to the subjacent active material or the material to become active, as well as to provide the maximum of said electrolytic action upon the exterior of the plates or electrodes.

My invention has certain other objects in view, and consists in certain features about to be described, and pointed out in my claims, reference being now had to the accompanying drawings, in which—

Figure 1 is a view of several electrodes assembled together, the containing-cell being broken away, this view being a cross-section on the line *a a* of Fig. 3. Fig. 2 is an elevation of one side of an electrode or plate, showing the conductor extended therethrough. Fig. 3 is a plan or top view of an element, showing several electrodes or plates assembled or intermembered. Fig. 4 is a perspective view of a portion of one electrode. Fig. 5 is a view similar to Fig. 1, being a cross-section on the line *d d* of Fig. 8, this view showing another form of construction. Fig. 6 is a side elevation of an element broken away to show the connecting-conductors. Fig. 7 is an enlarged detail view of a portion of two assembled and intermembered electrodes, showing more clearly the perforations for admitting the electrolyte. Fig. 8 is a top or plan view of a number of assembled electrodes of the type shown in Figs. 5 and 6, this view being broken away to show the interior of the active material.

I will first proceed with a description of one form of my improved element. (Shown in Figs. 1 to 4, inclusive.)

The general form of the plate or electrode is designated at 15 and shown more clearly in Fig. 3. It consists of a block or section of active material or material to become active, (designated at 16,) which may be oxid of lead or other suitable material. This section or block of material 16 has V-shaped projections extended longitudinally for the length of the plate or electrode which form the V-shaped corrugations 17. This section of active material constitutes an electrode or plate and is adapted for association or assemblage with a counterpart electrode or plate, the said two plates or electrodes being intermembered, as shown in Fig. 3. Each pair of intermembered plates or electrodes constitute a couple consisting of a positive and a negative electrode. It is evident that any number of these couples may be assembled and disposed within a containing-cell 18, of rubber or other suitable material, and connected together, as shown in Fig. 3, to the positive and the negative terminals 19 and 20.

Sinuously extended through the body of the active material or material to become active is the conducting-strip 21, of metallic lead or other suitable material, which proceeding from the bottom of the section of material 16 extends through said material, as shown in Fig. 2, to the upper edge of said section and is there connected with the positive terminal 19 or the negative terminal 20. The electrodes or plates 15 are insulated from each other by preferably a thin sheet of insulating material (designated at 22) of some absorbent material.

In order to permit the free circulation of the electrolyte, I perforate the electrodes, as shown at 23, thus affording opportunity for the penetration of the electrolyte to the subjacent material. It will be observed that these electrodes are very closely and intimately assembled and associated, and by reason of their construction and intimate intermembering permit the binding of the electrodes together, so as to constitute a self-supporting mass. It will be observed that sulphation is minimized, as no large surface grid is employed or other like metallic lead support. On the contrary conduction is obtained, in this instance, by means of an embedded sinuously-expanded conducting-strip 21, which affords no opportunity for sulphation. It is also evident that free circulation and complete penetration of the electrolyte to the subjacent lead or active material or material to become active by virtue of the perforations 23 and from the fact that vertical channels 24 are provided extending through the V-shaped projections 17.

In the form shown in Figs. 5 to 8, inclusive, I retain the general form of the electrode or plate 15, consisting of a section or block of active material or material to become active with V-shaped projections and recesses. In this form, however, I provide conducting-rods 25, of metallic lead or other suitable material, each one of which is extended through the vertical channels 24. The conducting-rods 25 are attenuated for the greater portion of their length to permit free circulation of the electrolyte and at intervals are enlarged, so as to be brought into close contact with the active material or the material to become active. The conducting-rods are respectively connected to the positive and negative terminals 19 and 20 at their upper ends and are secured at their lower ends to a connecting-piece 26. This section or block of the material in this form, as shown, is made up of a series of triangular-shaped columns of active material or material to become active, which are held supported in a vertical position by means of the conducting-rods. This feature constitutes a part of my invention; but I do not desire to be understood as limiting this form or type of plate in every case to this particular construction, for it is evident that the conducting-rods may be employed without making up the section or block from independent columns.

The vertical channels in the first type of plate described may be filled with carbon either in a granular form or in the form of a carbon rod.

Having thus described my invention, what I claim as new therein, and desire to secure by Letters Patent, is—

1. An electrode for secondary batteries comprising in its construction a section of oxid of lead formed in a complete integral mass having extensions forming ridges along its side or sides and corresponding recesses also formed by said ridges together with extended channels through the interior of the said section and a strip of conducting material extended through said section.

2. A secondary-battery couple comprising two electrodes each consisting of a section of oxid of lead formed in a complete integral mass having projecting ridges along its side or sides and corresponding recesses whereby the two electrodes are adapted to intermember, together with an insulating-piece between the electrodes and conductors for the plates.

3. An electrode for secondary batteries comprising a section of oxid of lead formed in a complete integral mass having extensions forming ridges along its side or sides and corresponding recesses formed by said ridges together with a conducting-strip extending sinuously through the interior of the complete section.

4. A secondary-battery couple comprising two electrodes each consisting of a section of oxid of lead formed in a complete integral mass having projecting ridges along its side or sides and corresponding recesses whereby the two electrodes are adapted to intermember, together with an insulating-piece between the electrodes and vertical channels and lateral perforations in the mass of oxid of lead to obtain free circulation of the electrolyte and conductors for said electrodes.

5. In a secondary battery, an electrode therefor, consisting of a section or block of active material or material to become active, comprised or made up of a plurality of integral triangular columns consisting of a complete integral mass of oxid of lead, having vertical channels extended therethrough, conducting-rods extended through the columns and means for supporting said rods at the top and bottom whereby said columns are held in place.

In testimony whereof I affix my signature in presence of two witnesses.

CHARLES RIDSDALE.

Witnesses:
L. M. BULKLEY,
J. B. WEIR.